United States Patent Office 3,144,447
Patented Aug. 11, 1964

3,144,447
PYRAZOLO-ANDROSTANES
Albert Bowers, John Edwards, and James C. Orr, all of Mexico City, Mexico, assignors, by mesne assignments, to Syntex Corporation, a corporation of Panama
No Drawing. Filed Aug. 1, 1961, Ser. No. 128,362
18 Claims. (Cl. 260—239.5)

The present invention relates to novel cyclopentanophenanthrene compounds and to a process for the production thereof.

More particularly the present invention relates to pyrazolo(3',4';2,3)-androstane derivatives and to the intermediates in the production thereof, namely, 3-hydroxymethylene-androstan-2-one derivatives.

The novel compounds of the present invention are represented by the following formulas:

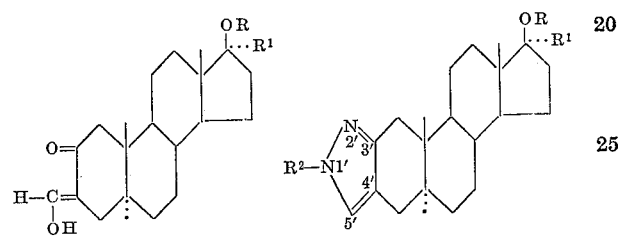

In the above formulas, R represents hydrogen or a hydrocarbon acyl group of less than 12 carbon atoms; $R^1$ represents hydrogen or an alkyl, alkenyl or alkinyl group containing from one to eight carbon atoms; $R^2$ may be hydrogen, a lower alkyl group or an aryl or aralkyl group each containing up to eight carbon atoms.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formulas are anabolic-androgenic agents with a particularly favorable anabolic/androgenic ratio. The compounds also relieve premenstrual tension and exhibit anti-estrogenic and anti-gonadotropic activities and possess useful blood cholesterol lowering properties.

The compounds of the present invention are prepared by the process exemplified by the following equation:

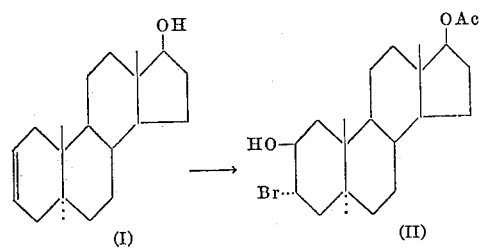

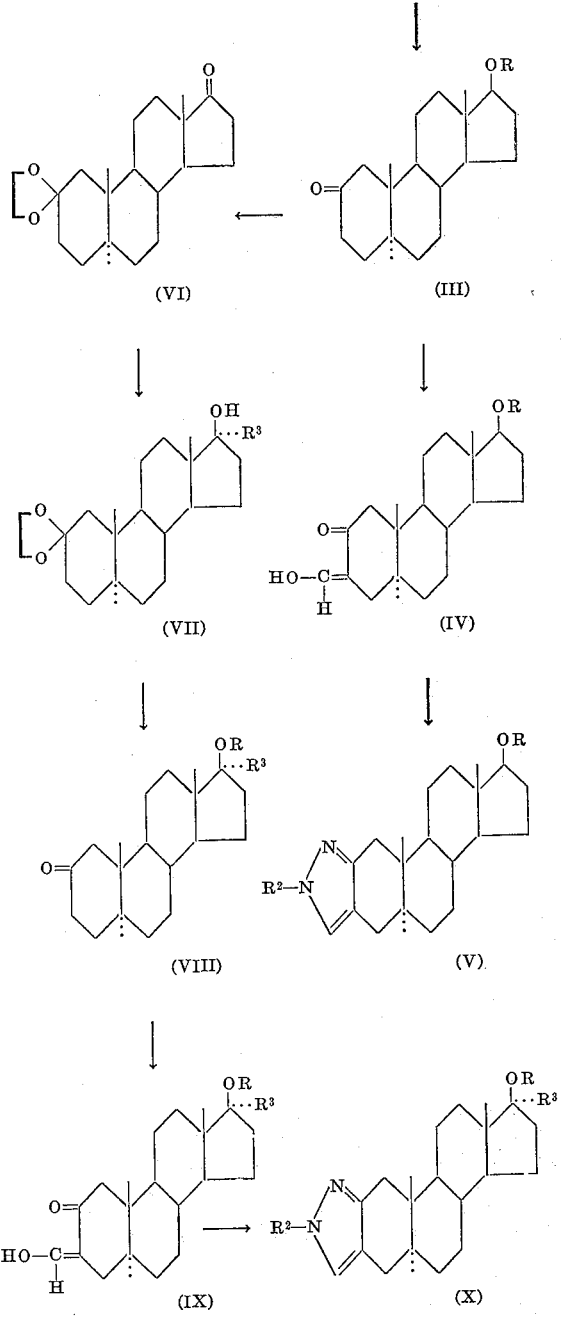

In the above formulas, R and $R^2$ have the same meaning as hereinbefore set forth; $R^3$ represents an aliphatic hydrocarbon radical and Ac represents an acyl group of the type hereinabove described but preferably is the acetyl group.

In practicing the process outlined above, the $\Delta^2$-androsten-17β-ol (I) is prepared, as described in the copending application Serial No. 128,361, filed of even date, by brominating dihydroallotestosterone acetate in the presence of hydrogen bromide with 1.1 molar equivalents of bromine in a suitable solvent, such as acetic acid, and subsequently reducing with an alkali metal borohydride, such as sodium borohydride, to afford 2α-bromo-androstan-3β,17β-diol. Treatment of the bromohydrin with zinc in a suitable solvent such as acetic acid at approximately 90° C. for a period of time of the order of one hour results in formation of the starting compound $\Delta^2$-androsten-17β-ol (I). Upon conventional acylation, preferably acetylation, of the latter compound followed by treatment with a N-haloamide, such as N-bromoacetamide in the presence of an acid, preferably perchloric acid, there is formed the corresponding bromohydrin acetate (II). Upon oxidation of this latter compound as for example with chromium trioxide-pyridine, there is obtained the corresponding 2-keto-3α-bromo-androstan-17β-ol-acetate which upon debromination affords androstan-17β-ol-2-one-acetate (III: R=acetyl). The latter compound may then be saponified with a base to afford the free alcohol (III: R=hydrogen) which upon conventional acylation with hydrocarbon carboxylic acids of the type mentioned previously affords the corresponding ester (III: R=acyl). The 2-keto-17β-ol-androstan compound or ester thereof (III) is reacted with ethyl formate in the presence of an alkali metal hydride such as sodium hydride followed by acidification to afford the corresponding 2-keto-3-hydroxymethylene derivative (IV).

Condensation of the latter derivative with a hydrazine or a substituted hydrazine such as a lower alkyl hydrazine, for example, methyl hydrazine, propyl hydrazine or an aryl hydrazine such as phenyl hydrazine, results in the formation of the corresponding pyrazolo (3′,4′;2,3)-androstan-17β-ol derivative or 17β-ester thereof (V).

For preparation of the novel compounds of the present invention containing an alkyl, alkenyl or alkinyl group at C–17α, the 2-keto group of androstan-17β-ol-2-one-acetate (III) is protected by conventional treatment with an alkylene glycol such as ethylene glycol to form the corresponding cycloalkylenedioxy derivative, preferably 2 - cycloethylenedioxy - androstan-17β-ol-acetate. Upon conventional saponification of the 17β-ester group as by treatment with dilute methanolic potassium hydroxide, there is afforded the 17β-hydroxy compound, 2-cycloethylenedioxy-androstan-17β-ol which upon oxidation, preferably with chromium trioxide-pyridine, is converted into 2-cycloethylenedioxy-androstan-17-one (VI).

Treatment of this latter derivative with a lower alkyl or lower alkinyl magnesium halide such as methyl magnesium bromide or ethinyl magnesium bromide results in the formation respectively of 2-cycloethylenedioxy-17α-methyl-androstan-17β-ol (VII: R³=methyl) and 2-cycloethylenedioxy-17α-ethinyl-androstan-17β-ol (VII: R³=ethinyl).

The latter compound is transformed into the corresponding 17α-alkenyl compound (VII: R³=alkenyl) by selective hydrogenation of the triple bond to the double bond in the presence of a suitable catalyst, preferably palladium-calcium carbonate catalyst.

The thus formed 17α-substituted-2-cycloethylenedioxy-androstan-17β-ol compounds (VII) are hydrolyzed to obtain the free 2-keto-17α-substituted androstan-17β-ol compounds (VIII: R=hydrogen) which are then conventionally esterified with an excess of the previously described hydrocarboxylic acid anhydrides or chlorides in the presence of p-toluenesulfonic acid to produce the corresponding 2 - keto - 17α - substituted - 17β - acyloxy-androstanes (VIII: R=acyl).

The latter compounds (VIII) are then treated with ethyl formate as described hereinabove to efford the corresponding 3-hydroxymethylene-2-keto-17α-substituted derivatives (IX) which upon further treatment with a hydrazine of the type mentioned previously afford the corresponding pyrazolo (3′,4′;2,3)-androstan compounds (X).

The following specific examples serve to illustrate but are not intended to limit the scope of the present invention:

*Example I*

A solution of 5 g. of dihydroallotestosterone acetate in 100 cc. of acetic acid was treated with a few drops of hydrogen bromide in acetic acid and subsequently dropwise and with stirring, with a solution of 1.1 molar equivalents of bromine in 50 cc. of acetic acid. After all the bromine had been consumed, water was added, the formed precipitate filtered, washed with water to neutral and dried under vacuum. Recrystallization from acetone-hexane yielded 2α-bromodihydroallotestosterone acetate.

*Example II*

A solution of 4 g. of sodium borohydride in 12 cc. of water was added to an ice-cooled solution of 4 g. of the foregoing 2α-bromo steroid in 250 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give 2α-bromo-androstan-3β,17β-diol.

*Example III*

2 g. of the foregoing bromohydrin in 50 cc. of acetic acid were mixed with 2 g. of zinc dust and heated at 90° C. for 1 hour at the end of which it was filtered through celite. The filtrate was concentrated to a small volume under reduced pressure, cooled and diluted with ice water to precipitate a crude product. Recrystallization from ether-hexane afforded $\Delta^2$-androsten-17β-ol.

*Example IV*

A mixture of 1 g. of the above steroid, 4 cc. of pyridine and 2 cc. of acetic anhydride was kept at room temperature overnight, poured into ice water, and the formed precipitate was filtered, washed with water and dried. Crystallization from acetone-hexane gave $\Delta^2$-androsten-17β-ol-acetate.

*Example V*

2 g. of $\Delta^2$-androsten-17β-ol-acetate (obtained in accordance with Example IV) were dissolved in 50 cc. of dioxane and 0.5 cc. of 1 N perchloric acid was added. 1 g. of N-bromoacetamide was then added with stirring in portions over a period of 40 minutes. The mixture was stirred for 1 hour further in the dark at room temperature and then decolorized by the addition of 10% aqueous sodium bisulfite solution. Water was added and the product was extracted with methylene chloride. The extract was washed with water, dried over anhydrous sodium sulfate and the solvent was evaporated under reduced pressure and at room temperature. Recrystallization from ether gave 3α-bromo-androstane-2β,17β-diol-17-acetate.

*Example VI*

A solution of 2 g. of the foregoing steroid in 40 cc. of pyridine was added to a mixture of 2 g. of chromic trioxide in 40 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 3α-bromo-androstan-17β-ol-2-one-acetate.

*Example VII*

This above compound was treated following the technique described in Example III thus furnishing androstan-17β-ol-2-one-acetate.

*Example VIII*

A mixture of 2 g. of the foregoing compound, 50 cc.

of dry benzene, 5 cc. of ethylene glycol and 0.03 g. of p-toluenesulfonic acid monohydrate was refluxed for 16 hours using a water separator. It was then washed with a sodium bicarbonate solution, water, and subsequently dried and evaporated to dryness. Recrystallization from acetone-hexane yielded 2-cycloethylenedioxy-androstan-17β-ol-acetate.

Example IX

The above product was dissolved in 50 cc. of methanol and refluxed with 15 cc. of a 10% methanolic potassium hydroxide solution for one hour. The reaction mixture was concentrated to half its original volume and diluted with water. The formed precipitate was filtered off, washed with water to neutral and crystallized from acetone-hexane to afford 2-cycloethylenedioxy-androstan-17β-ol.

Example X

The product of the foregoing example was oxidized following the method described in Example VI, yielding 2-cycloethylenedioxy-androstan-17-one.

Example XI

A solution of 1 g. of the foregoing steroid in 50 cc. of thiophene-free benzene was treated with 5.5 cc. of 4 N methylmagnesium bromide in ether and the mixture refluxed, with the exclusion of moisture, for 3 hours. The cooled mixture was cautiously treated with excess aqueous ammonium chloride solution and the product isolated by ethyl acetate extraction. The extract was washed with water, dried over anhydrous sodium sulfate and evaporated to dryness. Recrystallization from methylene chloride-hexane afforded 2-cycloethylenedioxy-17α-methyl-androstan-17β-ol.

Following exactly the above procedure, except that ethinyl magnesium bromide was used instead of methyl magnesium bromide, there was obtained 2-cycloethylenedioxy-17α-ethinyl-androstan-17β-ol.

Example XII

A solution of 3 g. of 2-cycloethylenedioxy-17α-ethinyl-androstan-17β-ol in 100 cc. of pyridine was hydrogenated at 25° C. and 570 mm. using 0.5 g. of pre-hydrogenated 2% palladium calcium carbonate catalyst. Hydrogenation was discontinued after the absorption of one equivalent of hydrogen; the solution was filtered and evaporated to dryness in vacuo. The residue was recrystallized from acetone affording 2-cycloethylenedioxy-17α-vinyl-androstan-17β-ol.

Example XIII 2 g. of the above steroid was heated on the steam bath with 100 cc. of 80% acetic acid under nitrogen for 2 hours, it was then concentrated under vacuum to a small volume and poured into water. The precipitate was collected, washed well with water, dried and recrystallized from acetone-hexane, thus furnishing 17α-vinyl-androstan-17β-ol-2-one.

By the same procedure, there were hydrolyzed 2-cycloethylenedioxy-17α-ethinyl-androstan-17β-ol, 2-cycloethylenedioxy-17α-methylandrostan-17β-ol, and 2-cycloethylenedioxy-androstan-17β-ol, affording correspondingly 17α-ethinyl-androstan-17β-ol-2-one, 17α-methyl-androstan-17β-ol-2-one, and androstan-17β-ol-2-one.

Example XIV 1 g. of androstan-17β-ol-2-one was treated following the technique described in Example IV, using in addition to acetic anhydride also propionic anhydride, caproic anhydride, cyclopentylpropionic anhydride and benzoyl chloride, giving respectively the 17-acetate, 17-propionate, 17-caproate, 17-cyclopentylpropionate and 17-benzoate of androstan-17β-ol-2-one.

Example XV

A mixture of 1 g. of 17α-vinyl-androstan-17β-ol-2-one, 1 g. of p-toluenesulfonic acid monohydrate, 50 cc. of acetic acid and 25 cc. of acetic anhydride was kept for 24 hours at room temperature. It was then poured into water and stirred until the excess of anhydride had hydrolyzed. Isolation of the product by methylene chloride extraction and crystallization of the residue from acetone-ether gave 17α-vinyl-androstan-17β-ol-2-one-17-acetate.

Following the above technique, there were treated 17α-methylandrostan-17β-ol-2-one, and 17α-ethinyl-androstan-17β-ol-2-one, thus furnishing respectively 17α-methyl-androstan-17β-ol-2-one-17-acetate, and 17α-ethinyl-androstan-17β-ol-2-one-17-acetate.

By the same technique, but substituting acetic anhydride by propionic anhydride, caproic anhydride and cyclopentylpropionic anhydride, there were correspondingly obtained the 17-propionates, 17-caproates and 17-cyclopentylpropionates of the above starting compounds.

Example XVI

To a solution of 1 g. of androstan-17β-ol-2-one in 20 cc. of anhydrous benzene was added 1 cc. of ethyl formate and 0.432 g. of sodium hydride, suspended in mineral oil while cooling and stirring under an atmosphere of nitrogen. The mixture was stirred for 24 hours at room temperature, hexane was added until complete precipitation, the solid was collected and dried under vacuum. The crude material was suspended in aqueous hydrochloric acid and was stirred at room temperature for half an hour. The precipitate was collected, washed with water and dried. Recrystallization from methylene-chloride-hexane gave 3-hydroxymethylene-androstan-17β-ol-2-one.

Following the same technique were treated the starting compounds listed below furnishing the corresponding products hereinafter set forth:

| Starting compound | Product |
|---|---|
| 17α-methyl-androstan-17β-ol-2-one | 3-hydroxymethylene-17α-methyl-androstan-17β-ol-2-one. |
| 17α-methyl-androstan-17β-ol-2-one-17-acetate. | 3-hydroxymethylene-17α-methyl-androstan-17β-ol-2-one-17-acetate. |
| 17α-methyl-androstan-17β-ol-2-one-17-propionate. | 3-hydroxymethylene-17α-methyl-androstan-17β-ol-2-one-17-propionate. |
| 17α-methyl-androstan-17β-ol-2-one-17-caproate. | 3-hydroxymethylene-17α-methyl-androstan-17β-ol-2-one-17-caproate. |
| 17α-methyl-androstan-17β-ol-2-one-17-cyclopentylpropionate. | 3-hydroxymethylene-17α-methyl-androstan-17β-ol-2-one-17-cyclopentylpropionate. |
| 17α-vinyl-androstan-17β-ol-2-one | 3-hydroxymethylene-17α-vinyl-androstan-17β-ol-2-one. |
| 17α-vinyl-androstan-17β-ol-2-one-17-acetate. | 3-hydroxymethylene-17α-vinyl-androstan-17β-ol-2-one-17-acetate. |
| 17α-vinyl-androstan-17β-ol-2-one-17-propionate. | 3-hydroxymethylene-17α-vinyl-androstan-17β-ol-2-one-17-propionate. |
| 17α-vinyl-androstan-17β-ol-2-one-17-caproate. | 3-hydroxymethylene-17α-vinyl-androstan-17β-ol-2-one-17-caproate. |
| 17α-vinyl-androstan-17β-ol-2-one-17-cyclopentylpropionate. | 3-hydroxymethylene-17α-vinyl-androstan-17β-ol-2-one-17-cyclopentylpropionate. |
| 17α-ethinyl-androstan-17β-ol-2-one | 3-hydroxymethylene-17α-ethinyl-androstan-17β-ol-2-one. |
| 17α-ethinyl-androstan-17β-ol-2-one-17-acetate. | 3-hydroxymethylene-17α-ethinyl-androstan-17β-ol-2-one-17-acetate. |
| 17α-ethinyl-androstan-17β-ol-2-one-17-propionate. | 3-hydroxymethylene-17α-ethinyl-androstan-17β-ol-2-one-17-propionate. |
| 17α-ethinyl-androstan-17β-ol-2-one-17-caproate. | 3-hydroxymethylene-17α-ethinyl-androstan-17β-ol-2-one-17-caproate. |
| 17α-ethinyl-androstan-17β-ol-2-one-17-cyclopentylpropionate. | 3-hydroxymethylene-17α-ethinyl-androstan-17β-ol-2-one-17-cyclopentylpropionate. |

Example XVII

A mixture of 2 g. of 3-hydroxymethylene-androstan-17β-ol-2-one, 0.3 g. of hydrazine hydrate and 50 cc. of ethanol was refluxed for 10 hours. After cooling, the product crystallized from the solution. The crystals were collected, affording pyrazolo(3′,4′;2,3)-androstan-17β-ol.

Following exactly the above technique, there were treated the starting compounds listed below with the hydrazine indicated to give the corresponding products hereinafter set forth.

| Starting compound | Hydrazine | Product |
|---|---|---|
| 3-hydroxymethylene-androstan-17β-ol-2-one. | Methyl hydrazine | 1'-methyl-pyrazolo (3',4';2,3)-androstan-17β-ol. |
| Do | Phenyl hydrazine | 1'-phenyl-pyrazolo (3',4';2,3)-androstan-17β-ol. |
| 3-hydroxymethylene-17α-methyl-androstan-17β-ol-2-one. | Hydrazine | pyrazolo(3',4';2,3)-17α-methyl-androstan-17β-ol. |
| 3-hydroxymethylene-17α-methyl-androstan-17β-ol-2-one-17-acetate. | Methyl hydrazine | 1'-methyl-pyrazolo (3',4';2,3)-17α-methyl-androstan-17β-ol-17-acetate. |
| 3-hydroxymethylene-17α-methyl-androstan-17β-ol-2-one-17-caproate. | Phenyl hydrazine | 1'-phenyl-pyrazolo (3',4';2,3)-17α-methyl-androstan-17β-ol-17-caproate. |
| 3-hydroxymethylene-17α-vinyl-androstan-17β-ol-2-one. | Methyl hydrazine | 1'-methyl-pyrazolo (3',4';2,3)-17α-vinyl-androstan-17β-ol. |
| 3-hydroxymethylene-17α-vinyl-androstan-17β-ol-2-one-17-propionate. | Hydrazine | pyrazolo(3',4';2,3)-17α-vinyl-androstan-17β-ol-17-propionate. |
| 3-hydroxymethylene-17α-vinyl-androstan-17β-ol-2-one-17-cyclopentyl-propionate. | Phenyl hydrazine | 1'-phenyl-pyrazolo (3',4';2,3)-17α-vinyl-androstan-17β-ol-17-cyclopentylpropionate. |
| 3-hydroxymethylene-17α-ethinyl-androstan-17β-ol-2-one. | do | 1'-phenyl-pyrazolo (3',4';2,3)-17α-ethinyl-androstan-17β-ol. |
| 3-hydroxymethylene-17α-ethinyl-androstan-17β-ol-2-one-17-acetate. | Hydrazine | pyrazolo(3',4';2,3)-17α-ethinyl-androstan-17β-ol-17-acetate. |
| 3-hydroxymethylene-17α-ethinyl-androstan-17β-ol-2-one-17-cyclopentyl-propionate. | Methyl hydrazine | 1'-methyl-(pyrazolo) (3',4';2,3)-17α-ethinyl-androstan-17β-ol-17-cyclopentylpropionate. |

We claim:
1. A compound of the following formula:

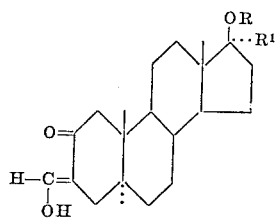

wherein R is selected from the group consisting of hydrogen and a hydrocarbon carboxylic acyl group of less than 12 carbon atoms and $R^1$ is a member of the group consisting of hydrogen, an alkyl, and alkenyl and an alkinyl group, each containing from one to eight carbon atoms.
2. 3-hydroxymethylene-androstan-17β-ol-2-one.
3. 3-hydroxymethylene-17α-methyl-androstan-17β-ol-2-one.
4. 3-hydroxymethylene-17α-methyl-androstan-17β-ol-2-one-17-acetate.
5. 3-hydroxymethylene-17α-vinyl-androstan-17β-ol-2-one.
6. 3-hydroxymethylene-17α-vinyl-androstan-17β-ol-2-one-17-propionate.
7. 3-hydroxymethylene-17α-ethinyl-androstan-17β-ol-2-one.
8. 3-hydroxymethylene-17α-ethinyl-androstan-17β-ol-2-one-17-caproate.
9. A compound of the following formula:

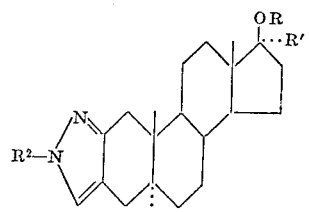

wherein R is selected from the group consisting of hydrogen and a hydrocarbon carboxylic acyl group of less than 12 carbon atoms; $R^1$ is a member of the group consisting of hydrogen, an alkyl, an alkenyl, and an alkinyl group each containing from one to eight carbon atoms, and $R^2$ is selected from the group consisting of hydrogen, lower alkyl, an aryl and aralkyl group each containing up to 8 carbon atoms.
10. Pyrazolo(3',4';2,3)-androstan-17β-ol.
11. 1'-methyl-pyrazolo(3',4';2,3)-androstan-17β-ol.
12. 1'-phenyl-pyrazolo(3',4';2,3)-androstan-17β-ol.
13. Pyrazolo(3',4';2,3)-17α-methyl-androstan-17β-ol.
14. 1'-methyl-pyrazolo(3',4';2,3) - 17α - methyl-androstan-17β-ol-17-acetate.
15. 1'-methyl-pyrazolo(3',4';2,3) - 17α - vinyl-androstan-17β-ol.
16. Pyrazolo(3',4';2,3)-17α-vinyl-androstan - 17β - ol-17-propionate.
17. 1'-phenyl-pyrazolo(3',4';2,3)-17α-ethinyl - androstan-17β-ol.
18. 1'-methyl-pyrazolo(3',4';2,3)-17α-ethinyl - androstan-17β-ol-17-cyclopentylpropionate.

References Cited in the file of this patent
UNITED STATES PATENTS
2,945,852    Bergstrom            July 19, 1960
OTHER REFERENCES
Clinton et al.: J.A.C.S., vol. 81 (1959), p. 1513.
Clinton et al.: J.A.C.S., vol. 83 (1961), pp. 1478–1491.